(12) United States Patent
Kim et al.

(10) Patent No.: US 9,195,107 B2
(45) Date of Patent: Nov. 24, 2015

(54) LIQUID CRYSTAL DISPLAY

(71) Applicant: SAMSUNG DISPLAY CO., LTD., Yongin (KR)

(72) Inventors: Sung-Woon Kim, Suwon-si (KR); Hee-Seop Kim, Hwaseong-si (KR); Hyang-Yul Kim, Hwaseong-si (KR); Joo-Nyung Jang, Gyeongsan-si (KR); Hwa-Sung Woo, Suwon-si (KR); Cheol Shin, Hwaseong-si (KR); Dong-Chul Shin, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/480,122

(22) Filed: Sep. 8, 2014

(65) Prior Publication Data

US 2014/0375917 A1   Dec. 25, 2014

Related U.S. Application Data

(62) Division of application No. 12/650,953, filed on Dec. 31, 2009, now abandoned.

(30) Foreign Application Priority Data

May 29, 2009   (KR) ........................ 10-2009-0047425

(51) Int. Cl.
*G02F 1/1343* (2006.01)
*G02F 1/1362* (2006.01)
(Continued)

(52) U.S. Cl.
CPC ........ *G02F 1/136213* (2013.01); *G02F 1/1368* (2013.01); *G02F 1/1393* (2013.01); *G02F 1/13624* (2013.01); *G02F 1/134363* (2013.01); *G02F 1/136286* (2013.01)

(58) Field of Classification Search
CPC ................................................ G02F 1/136286
See application file for complete search history.

(56) References Cited

U.S. PATENT DOCUMENTS 8,836,903 B2 *   9/2014   Cho et al. ........................ 349/144
2003/0090448 A1   5/2003   Tsumura et al.
(Continued)

FOREIGN PATENT DOCUMENTS

CN   1187632   7/1998
CN   1734547   2/2006
(Continued)

OTHER PUBLICATIONS

EP Search Report dated Nov. 24, 2010 of the corresponding European Patent Application No. 10000787.1.
(Continued)

*Primary Examiner* — Timothy L Rude
(74) *Attorney, Agent, or Firm* — Cantor Colburn LLP

(57) ABSTRACT

A liquid crystal display includes: first and second gate lines disposed on the first substrate and which respectively transmit first and second gate signals; first, second and third data lines disposed on the first substrate; a first switching element connected to the first gate line and the first data line; a second switching element connected to the first gate line and the second data line; a third switching element connected to the second gate line and the second data line; a fourth switching element connected to the second gate line and the third data line; first and second pixel electrodes respectively connected to the first and second switching and which form a first liquid crystal capacitor; and third and fourth pixel electrodes respectively connected to the third and fourth switching elements and which form a second liquid crystal capacitor.

4 Claims, 14 Drawing Sheets

(51) Int. Cl.
*G02F 1/139* (2006.01)
*G02F 1/1368* (2006.01)

(56) References Cited

U.S. PATENT DOCUMENTS

| | | |
|---|---|---|
| 2003/0169379 A1 | 9/2003 | Tsumura et al. |
| 2003/0189563 A1 | 10/2003 | Sato et al. |
| 2005/0237472 A1 | 10/2005 | Shibahara et al. |
| 2006/0034125 A1 | 2/2006 | Kim et al. |
| 2006/0109227 A1 | 5/2006 | Park |
| 2006/0186913 A1 | 8/2006 | Kim |
| 2006/0215066 A1 | 9/2006 | Ueda et al. |
| 2007/0002253 A1 | 1/2007 | Kim et al. |
| 2007/0080370 A1 | 4/2007 | Miyachi et al. |
| 2007/0120797 A1 | 5/2007 | Lin et al. |
| 2009/0091587 A1 | 4/2009 | Kim et al. |
| 2009/0135322 A1 | 5/2009 | Kim et al. |
| 2009/0160832 A1* | 6/2009 | Lee ............ 345/205 |
| 2009/0290081 A1* | 11/2009 | Cho et al. ............ 349/42 |
| 2009/0310047 A1 | 12/2009 | Shin et al. |
| 2010/0053484 A1 | 3/2010 | Ono |
| 2010/0207861 A1 | 8/2010 | Chang et al. |

FOREIGN PATENT DOCUMENTS

| | | |
|---|---|---|
| CN | 1764865 | 4/2006 |
| EP | 0837445 | 4/1988 |
| EP | 0717304 | 9/2001 |
| GB | 2431279 | 12/2007 |
| JP | 05100209 | 4/1993 |
| JP | 2000020033 | 1/2000 |
| JP | 2002014322 | 1/2002 |
| JP | 2003131636 | 5/2003 |
| JP | 2003302942 | 10/2003 |
| JP | 2006292854 | 10/2006 |
| JP | 2007041578 | 2/2007 |
| JP | 2007121767 | 5/2007 |
| JP | 2010230888 | 10/2010 |
| KR | 1020040107672 | 12/2004 |
| KR | 1020060025785 | 3/2006 |
| KR | 1020070094295 | 9/2007 |
| KR | 1020080002278 | 1/2008 |
| WO | 2004086129 | 10/2004 |

OTHER PUBLICATIONS

Extended European Search Report for Appl. No. 11002346.2-2205 dated Aug. 11, 2011.

* cited by examiner

LIQUID CRYSTAL DISPLAY

This application is a divisional of U.S. patent application Ser. No. 12/650,953, filed on Dec. 31, 20009, which claims priority to Korean Patent Application No. 10-2009-0047425, filed on May 29, 2009, and all the benefits accruing therefrom under 35 U.S.C. §119, the content of which in its entirety is herein incorporated by reference.

BACKGROUND OF THE INVENTION (a) Field of the Invention

The present invention relates to a liquid crystal display.

(b) Description of the Related Art

A liquid crystal display ("LCD") is a widely used type of flat panel display ("FPD"), and typically includes two display panels on which field generating electrodes, such as pixel electrodes and a common electrode, are disposed, and a liquid crystal layer interposed between the two display panels. Voltages are applied to the field generating electrodes to generate an electric field in the liquid crystal layer. The electric field determines orientations of liquid crystal molecules in the liquid crystal layer, and controls polarization of incident light to display an image.

The LCD may further include switching elements connected to pixel electrodes, and signal lines such as gate lines and data lines, for example, which control the switching elements and apply voltages to the pixel electrodes.

The LCD typically receives an input image signal from an external source, e.g., a graphics controller, and the input image signal includes luminance information for each pixel, and the luminance information includes grayscale values. Each pixel receives the data voltage corresponding to the luminance information. The data voltage is applied to each pixel, and a difference between the data voltage and the common voltage is a pixel voltage. Each pixel thereby displays a luminance representing a gray level of the image signal based on the pixel voltage. A range of the pixel voltage applied to the liquid crystal display may vary based on a driver.

In a conventional LCD, the driver of the liquid crystal display may be disposed on the display panel as an integrated circuit ("IC") chip, or disposed on a flexible circuit film and attached to the display panel. However, the IC chip increases the manufacturing cost of the liquid crystal display. Particularly, the cost of the driver of the liquid crystal display is substantially increased as the number of data lines applying the data voltage is increased.

BRIEF SUMMARY OF THE INVENTION

Exemplary embodiments of the present invention provide a liquid crystal display ("LCD") having advantages that include, but are not limited to, increased contrast ratio and viewing angle, improved response speed of liquid crystal molecules, and reduced cost of the driver of the liquid crystal display by decreasing a required number of data lines.

An exemplary embodiment of a liquid crystal includes: a first substrate and a second substrate disposed opposite the first substrate; a liquid crystal layer interposed between the first and second substrates and including liquid crystal molecules; a first gate line disposed on the first substrate and which transmits a first gate signal; a second gate line disposed on the first substrate and which transmits a second gate signal; a first data line disposed on the first substrate, a second data line disposed on the first substrate, and a third data line disposed on the first substrate; a first switching element connected to the first gate line and the first data line; a second switching element connected to the first gate line and the second data line; a third switching element connected to the second gate line and the second data line; a fourth switching element connected to the second gate line and the third data line; a first pixel electrode connected to the first switching element; a second pixel electrode connected to the second switching element and separated from the first pixel electrode; a third pixel electrode connected to the third switching element; and a fourth pixel electrode connected to the fourth switching element and separated from the third pixel electrode, where the first pixel electrode and the second pixel electrode form a first liquid crystal capacitor, and the third pixel electrode and the fourth pixel electrode form a second liquid crystal capacitor.

In an exemplary embodiment, the first pixel electrode may include first branches, the second pixel electrode may include second branches, and the first branches of the first pixel electrode and the second branches of the second pixel electrode may be alternately disposed on the first substrate. The third pixel electrode may include third branches, the fourth pixel electrode may include fourth branches, and the third branches of the third pixel electrode and the fourth branches of the fourth pixel electrode may be alternately disposed on the first substrate.

In an exemplary embodiment, when the first gate line receives a gate on signal, the first pixel electrode may receive a first data voltage from the first data line, the second pixel electrode may receive a second data voltage from the second data line, and a polarity of the first data voltage with respect to a reference voltage may be opposite to a polarity of the second data voltage with respect to the reference voltage.

In an exemplary embodiment, when the second gate line receives a gate-on signal, the third pixel electrode may receive a third data voltage from the second data line, the fourth pixel electrode may receive a fourth data voltage from the third data line, a polarity of the third data voltage with respect to the reference voltage may be opposite to a polarity of the fourth data voltage with respect to the reference voltage, and the polarity of the second data voltage may be the same as the polarity of the third data voltage.

An exemplary embodiment of the liquid crystal display may further include: a third gate line disposed on the first substrate; a fourth gate line disposed on the first substrate; a fourth data line disposed on the first substrate, a fifth data line disposed on the first substrate, and a sixth data line disposed on the first substrate; a fifth switching element connected to the third gate line and the fourth data line; a sixth switching element connected to the third gate line and the fifth data line; a seventh switching element connected to the fourth gate line and the fifth data line; an eighth switching element connected to the fourth gate line and the sixth data line; a fifth pixel electrode connected to the fifth switching element, a sixth pixel electrode connected to the sixth switching element and separated from the fifth pixel electrode, and a seventh pixel electrode connected to the seventh switching element, an eighth pixel electrode connected to the eighth switching element and separated from the seventh pixel electrode, where the third gate line may be connected to the first gate line and transmit the first gate signal, the fourth gate line may be connected to the second gate line and transmit the second gate signal, the fifth pixel electrode and the sixth pixel electrode form a third liquid crystal capacitor, and the seventh pixel electrode and the eighth pixel electrode may form a fourth liquid crystal capacitor.

In an exemplary embodiment, the first data line and the fourth data line may be disposed substantially adjacent to each other, the second data line and the fifth data line may be disposed substantially adjacent to each other, and the third data line and the sixth data line may be disposed substantially adjacent to each other.

In an exemplary embodiment, the fifth may include fifth branches, the sixth pixel electrode may include sixth branches, and the fifth branches of the fifth pixel electrode and the sixth branches of the sixth pixel electrode may be alternately disposed on the first substrate. The seventh pixel electrode may include seventh branches, the eighth pixel electrode may include eighth branches, and the seventh branches the seventh pixel electrode and the eighth branches of the eighth pixel electrode may be alternately disposed on the first substrate.

An exemplary embodiment of the liquid crystal display may further include a first storage capacitor connected to the first switching element and a second storage capacitor connected to the second switching element and separated from the first storage capacitor.

An exemplary embodiment of the liquid crystal display may further include a capacitive electrode connected to the first pixel electrode and which overlaps the second pixel electrode with an insulating layer disposed therebetween, and the capacitive electrode and the second pixel electrode form a storage capacitor.

An alternative exemplary embodiment of the liquid crystal display includes: a first substrate and a second substrate facing disposed opposite the first substrate; a liquid crystal layer interposed between the first and second substrates and including liquid crystal molecules; a first gate line disposed on the first substrate and which transmits a first gate signal; a second gate line disposed on the first substrate and which transmits a second gate signal; a third gate line disposed on the first substrate and which transmits a third gate signal; a first data line disposed on the first substrate and a second data line disposed on the first substrate; a first switching element connected to the first gate line and the first data line; a second switching element connected to the second gate line and the second data line; a third switching element connected to the third gate line and an output terminal of the second switching element; and a first pixel electrode connected to the first switching element and a second pixel electrode connected to the second switching element and separated from the first pixel electrode, where an input terminal of the third switching element is connected to the output terminal of the second switching element, an output terminal of the third switching element is connected to the second pixel electrode, and the first pixel electrode and the second pixel electrode form a first liquid crystal capacitor.

In an exemplary embodiment, when the first gate line receives a gate-on signal, the first pixel electrode may receive a first data voltage from the first data line and the third pixel electrode may receive a second data voltage from the second data line. When the second gate line receive the gate-on signal, the second pixel electrode may receive a third data voltage from the second data line and the fourth pixel electrode may receive a fourth data voltage from the third data line, the first data voltage and the second data voltage may have different polarities, and the second data voltage and the third data voltage may have different polarities.

In an exemplary embodiment, when the third gate line receives the gate on signal, the second data voltage may be transmitted through the third switching element.

An exemplary embodiment of the liquid crystal display may further include: a fourth gate line disposed on the first substrate, a fifth gate line disposed on the first substrate, and a sixth gate line disposed on the first substrate; a third data line disposed on the first substrate and a fourth data line disposed on the first substrate; a fourth switching element connected to the fourth gate line and the third data line; a fifth switching element connected to the fifth gate line and the fourth data line; a sixth switching element connected to the sixth gate line and an output terminal of the fifth switching element; and a third pixel electrode connected to the fourth switching element and a fourth pixel electrode connected to the fifth switching element and separated from the third pixel electrode, where the fourth gate line may be connected to the first gate line and transmit the first gate signal, the fifth gate line may be connected to the second gate line and transmit the second gate signal, the sixth gate line may be connected to the third gate line and transmit the same gate signal, and the third pixel electrode and the fourth pixel electrode may form a second liquid crystal capacitor.

In an exemplary embodiment, the first data line and the third data line may be disposed substantially adjacent to each other, and the second data line and the fourth data line may be disposed substantially adjacent to each other.

An alternative exemplary embodiment of a liquid crystal display includes: a first substrate and a second substrate disposed opposite the first substrate; a liquid crystal layer interposed between the first and second substrates and including liquid crystal molecules; a first gate line disposed on the first substrate and which transmit a first gate signal; a second gate line disposed on the first substrate and which transmits a second gate signal; a data line disposed on the first substrate; a first switching element connected to the first gate line and the data line; a second switching element connected to the second gate line and the data line; a first pixel electrode connected to the first switching element; a second pixel electrode connected to the second switching element and separated from the first pixel electrode; and a step-up capacitor including a first capacitive electrode and a second capacitive electrode connected to the first and second switching elements, respectively, and which overlap each other with an insulating layer disposed therebetween, where the first pixel electrode and the second pixel electrode form a first liquid crystal capacitor.

In an exemplary embodiment, when the first gate line receives a gate-on signal, the first pixel electrode and the first capacitive electrode may receive the first data voltage from the data line, when the second gate line receives the gate-on signal, the second pixel electrode and the second capacitive electrode may receives the second data voltage from the data line, and voltages of the first pixel electrode and the first capacitive electrode may be substantially increased.

An exemplary embodiment of the liquid crystal display may further include a third switching element including an input terminal connected to the first gate line and an output terminal connected to the second pixel electrode and the second capacitive electrode, and the input terminal of the third switching element may receive a common voltage.

In an exemplary embodiment, when the first gate line receives the gate-on signal, the second pixel electrode and the second capacitive electrode may receive the common voltage through the third switching element.

BRIEF DESCRIPTION OF THE DRAWINGS

The above and other aspects, advantages and features of the present invention will become more apparent by describing in further detail exemplary embodiments thereof with reference to the accompanying drawings, in which.

DETAILED DESCRIPTION OF THE INVENTION

Figure 1:
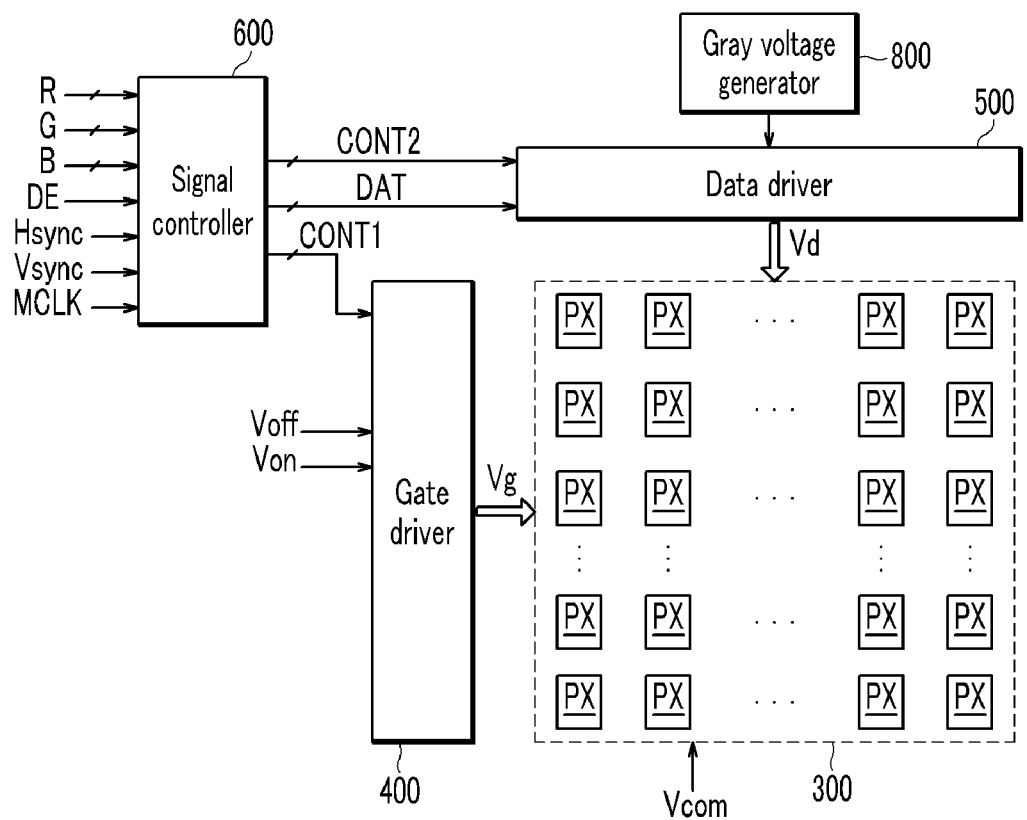
FIG. 1 is a block diagram of an exemplary embodiment of a liquid crystal display according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
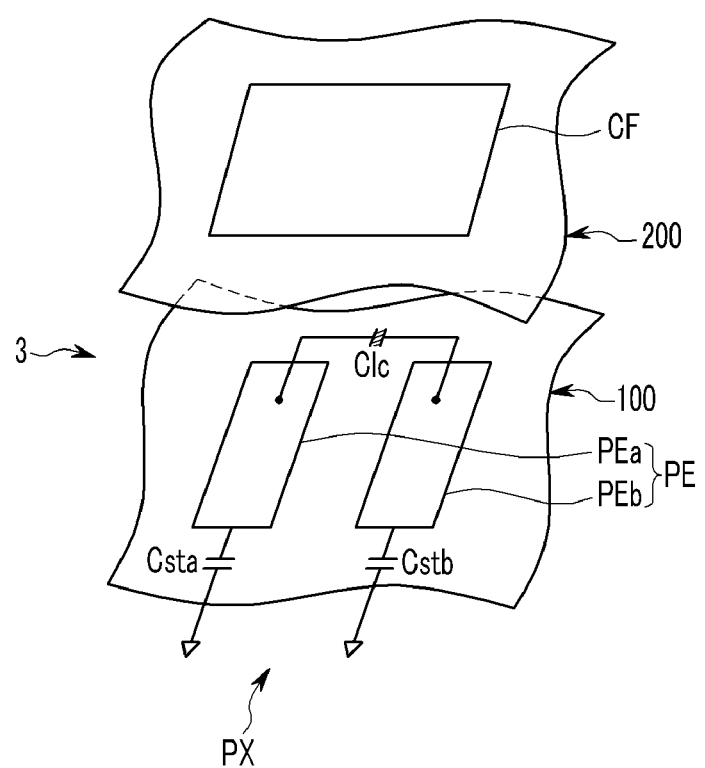
FIG. 2 is a schematic equivalent circuit diagram of an exemplary embodiment of a pixel according to the present invention.

FIG. 1 is a block diagram of an exemplary embodiment of a liquid crystal display according to the present invention, and FIG. 2 is a schematic equivalent circuit diagram of an exemplary embodiment of a pixel according to an exemplary embodiment of the present invention.

As shown in FIG. 1, the liquid crystal display includes a liquid crystal panel assembly 300, a gate driver 400, a data driver 500, a gray voltage generator 800 and a signal controller 600.

As shown in FIG. 2, the liquid crystal panel assembly 300 includes a lower panel 100 and an upper panel 200 disposed to, e.g., facing, the lower panel 100, and a liquid crystal layer 3 interposed between the lower panel 100 and the upper panel (hereinafter collectively referred to as "display panels 100 and 200).

The liquid crystal capacitor Clc includes a first pixel electrode PEa and a second pixel electrode PEb of the lower panel 100 as two terminals thereof, and the liquid crystal layer 3 between the first pixel electrode PEa and the second pixel electrode PEb may be a dielectric. The first pixel electrode PEa is connected to a first switching element (not shown in FIG. 2), and the second pixel electrode PEb is connected to a second switching element (not shown). The first switching element and the second switching element are connected to corresponding gate lines (not shown) and data lines (not shown).

The liquid crystal layer 3 has dielectric anisotropy, and liquid crystal molecules of the liquid crystal layer 3 may be arranged such that their longitudinal axes are aligned substantially vertical to surfaces of the display panels 100 and 200 when an electric field is not applied in the liquid crystal layer 3. The liquid crystal layer 3 may have positive dielectric anisotropy.

The first pixel electrode PEa and the second pixel electrode PEb may be disposed on two different layers or on a same layer, and the liquid crystal panel assembly may further include a common electrode (not shown) disposed on one panel of the lower panel 100 and the upper panel 200. Separate electrodes (not shown) disposed on the lower panel 100 may overlap the first and second pixel electrodes PEa and PEb via an insulator interposed therebetween, and thereby form a first storage capacitor (not shown) and a second storage capacitor (not shown), which assist the liquid crystal capacitor Clc.

In an exemplary embodiment, when a display panel displays colors, each pixel PX may display one of primary colors (spatial division), or each pixel PX may display primary colors in turn (temporal division). In an exemplary embodiment, the primary colors may be spatially or temporally synthesized, and a predetermined color is thereby displayed. The primary colors may be three primary colors, such as red, green and blue, for example. In an exemplary embodiment, as shown in FIG. 2, each pixel PX may include a color filter CF, corresponding to one of the primary colors, disposed on the upper panel 200. In an alternative exemplary embodiment, the color filter CF may be disposed on or below the first and second pixel electrodes PEa and PEb of the lower panel 100.

In an exemplary embodiment, the liquid crystal panel assembly 300 includes at least one polarizer (not shown) which provides light polarization.

An operation of a liquid crystal display according to an exemplary embodiment of the present invention will be described hereafter.

Figure 3:
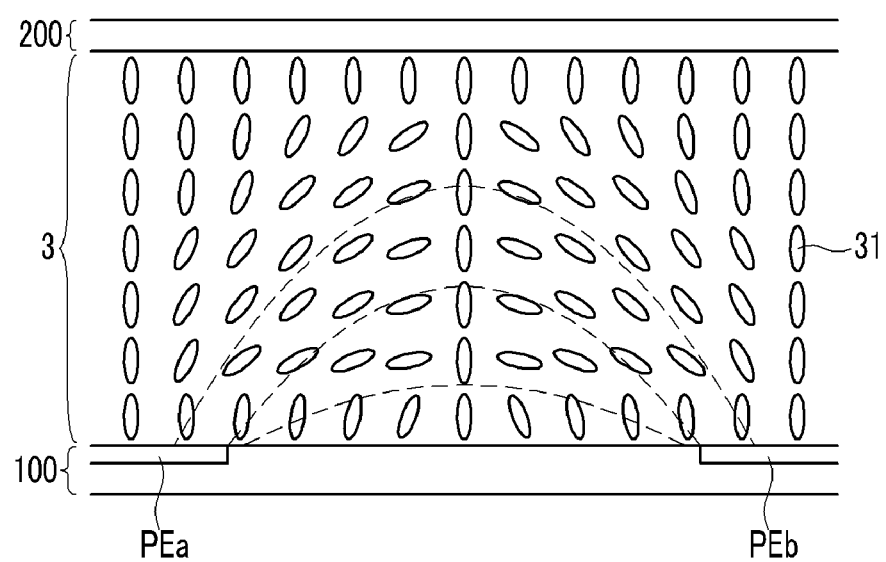
FIG. 3 is a partial cross-sectional view of an exemplary embodiment of a liquid crystal display according to the present invention.

FIG. 3 is a partial cross-sectional view of an exemplary embodiment of a liquid crystal display according to the present invention.

As shown in FIG. 2 and FIG. 3, when a data line connected to a pixel PX receives a data voltage, the data voltage is applied to the pixel PX through the first and second switching elements turned on by the gate signal. When the first and second switching elements turned on by the gate signal, the first pixel electrode PEa receives a first data voltage through the first switching element, and the second pixel electrode PEb receives a second data voltage through the second switching element. In an exemplary embodiment, two data voltages, e.g., the first data voltage and the second data voltage, applied to the first and second pixel electrodes PEa and PEb, respectively, may be data voltages corresponding to a luminance to be displayed by the pixel PX, and may have opposite polarities with respect to a reference voltage Vref.

The difference between the two data voltages applied to the first and second subpixels PXa and PXb may be a charged voltage of the liquid crystal capacitors Clc, e.g., a pixel voltage. When a potential difference is generated between two terminals of the liquid crystal capacitor Clc, as shown in FIG. 3, an electric field parallel to the surfaces of the display panel 100 and 200 is generated in the liquid crystal layer 3 between the first pixel electrode PEa and the second pixel electrode PEb. When liquid crystal molecules 31 have positive dielectric anisotropy, the liquid crystal molecules 31 are arranged such that the longitudinal axes thereof are aligned to be parallel to a direction of the electric field, and inclination degrees of the liquid crystal molecules 31 may vary based on a magnitude of the pixel voltage. When the liquid crystal molecules 31 are aligned as described above, the liquid crystal layer 3 is referred to as an electrically-induced optical compensation ("EOC") mode liquid crystal layer. In an exemplary embodiment, a degree of a change of polarization of light passing through the liquid crystal layer 3 may vary based on the inclination degree of the liquid crystal molecules 31. The change of the polarization may change transmittance of the light by the polarizer, and the pixel PX thereby displays a predetermined luminance.

In an exemplary embodiment, when one pixel PX receives the two data voltages having opposite polarities with respect to the reference voltage Vref, a driving voltage is substantially increased and a response speed and a transmittance of the liquid crystal molecule are thereby substantially increased. In an exemplary embodiment, when the polarities of the two data voltages applied to one pixel PX are opposite to each other, degradation of the display quality due to flicker is substantially prevented under driving types such as a column inversion or a row inversion, for example, as the degradation is substantially prevented under a dot inversion.

In an exemplary embodiment, when the first and second switching elements are turned off in one pixel PX, the two data voltages applied to the first and second pixel electrodes PEa and PEb are substantially decreased by a kickback voltage such that the charging voltage of the pixel PX is substantially maintained, and display characteristics of the liquid crystal display are thereby effectively improved.

Figure 4:
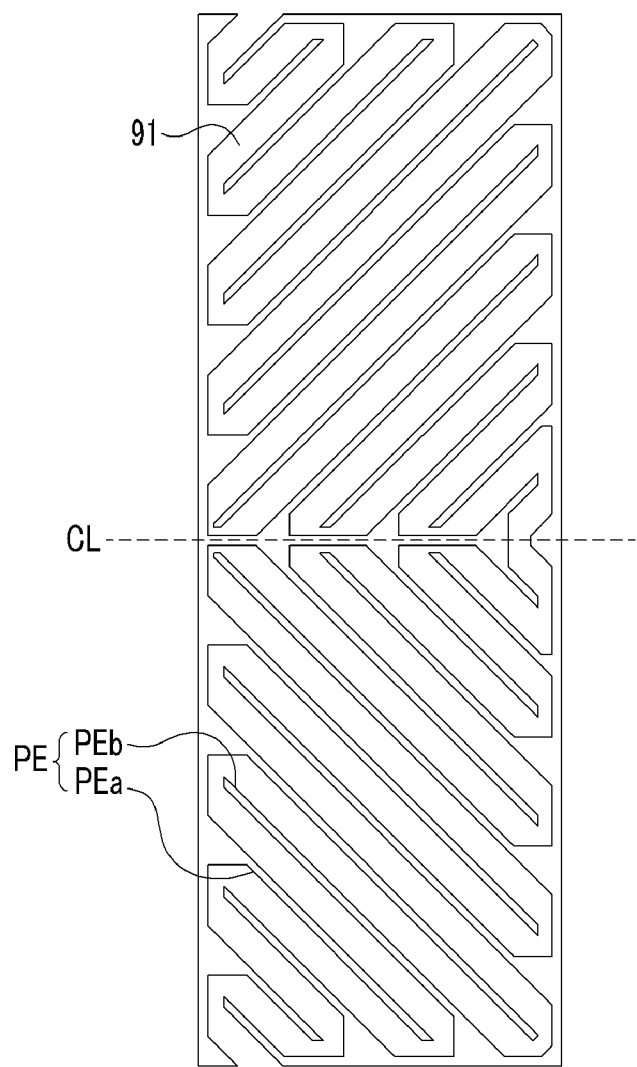
FIG. 4 is a plan view illustrating a layout of an exemplary embodiment of pixel electrodes of a liquid crystal display according to the present invention.

A layout of an exemplary embodiment of the first and second pixel electrodes PEa and PEb of a pixel PX of the liquid crystal panel assembly according to the present invention will be descried hereafter. FIG. 4 is a plan view of a layout of an exemplary embodiment of pixel electrodes of a pixel of a liquid crystal display.

As shown in FIG. 4, an overall contour of the pixel electrodes PE including the first pixel electrode PEa and the second pixel electrode PEb has a quadrangle shape. The first pixel electrode PEa and the second pixel electrode PEb are engaged with each other with a gap 91 therebetween. The first and second pixel electrodes PEa and PEb, respectively, are substantially mirror symmetric with respect to an imaginary transverse center line CL. The first pixel electrode PEa includes a first upper region disposed above the imaginary transverse center line CL and a first lower region disposed below the imaginary transverse center line CL, and the second pixel electrode PEb includes a second upper region disposed above the imaginary transverse center line CL and a second lower region disposed below the imaginary transverse center line CL.

The first pixel electrode PEa includes an upper projection, a lower projection, a first left longitudinal stem, a first transverse stem extending to a right direction from a center of the first left longitudinal stem, first upper branches and first lower branches. The first upper branches disposed above the imaginary transverse center line CL extend substantially obliquely in an upper right direction from the first left longitudinal stem and from the first transverse stem. The first lower branches disposed below the imaginary transverse center line CL extend substantially obliquely in a lower right direction from the first left longitudinal stem and the first transverse stem. An angle between the first upper and lower branches and the gate line 121 or an angle between the first upper and lower branches and the transverse center line CL may be about 45 degrees.

The second pixel electrode PEb includes a middle projection, a second right longitudinal stem, a second upper transverse stem, a second lower transverse stem, second upper branches and second lower branches. The second upper transverse stem and the second lower transverse stem extend substantially horizontally to a left direction from a lower end and an upper end of the longitudinal stem, respectively. The second upper branches disposed above the imaginary transverse center line CL extends substantially obliquely in a lower left direction from the second right longitudinal stem or the second upper transverse stem. The second lower branches disposed below the imaginary transverse center line CL extends substantially obliquely in an upper left direction from the second right longitudinal stem or the second lower transverse stem. An angle between the second upper and lower branches of the second pixel electrode PEb and the gate line 121 or an angle between the second upper and lower branches of the second pixel electrode PEb and the imaginary transverse center line CL may be about 45 degrees. An angle between the second upper branches adjacent to the imaginary transverse center line CL and the second lower branches adjacent to the imaginary transverse center line CL may be about 90 degrees. [NOTE: It is not clear from the FIG. 4 what specifically the "projections" of the first and second pixel electrodes are. Please confirm that the first projections of the first pixel electrode are projections at the ends of the first left longitudinal stem, and the second projection of the second pixel electrode is the projection at the center of the second right longitudinal stem.]

The first upper and lower branches of the first subpixel electrode PEa and the second upper and lower branches of the second subpixel electrode PEb are alternately disposed by engaging the upper and lower branches of the first subpixel electrodes PEa with the upper and lower branches of the second subpixel electrodes PEb, respectively, with a predetermined gap 91 therebetween, and thereby formed in a pectinated pattern.

In an alternative exemplary embodiment, the first and second pixel electrodes PEa and PEb of the pixel PX of the liquid crystal display may be in a different shape in which at least a portions the first pixel electrode PEa and at least a portion of the second pixel electrode PEb are alternately disposed in a same layer.

Figure 5:
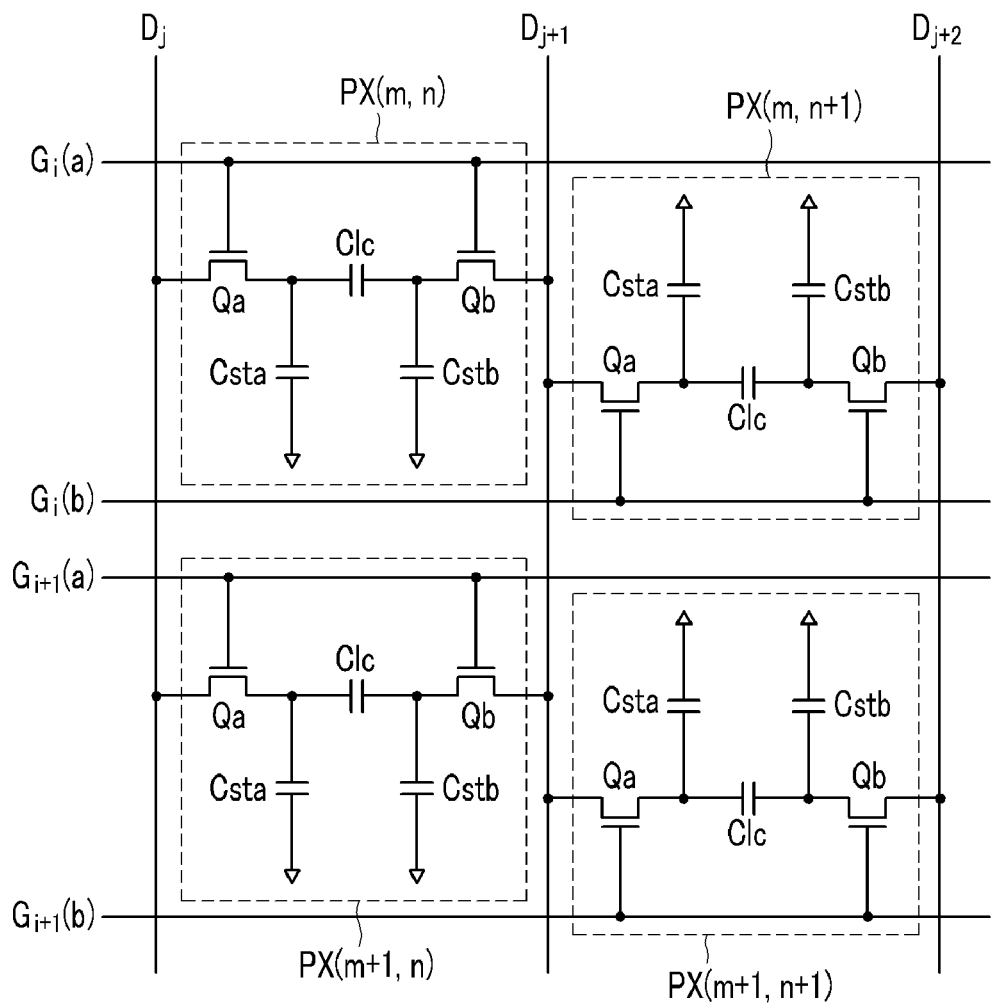
FIG. 5 is a schematic circuit diagram of an exemplary embodiment of four pixels of a liquid crystal display according to the present invention.
Figure 6:
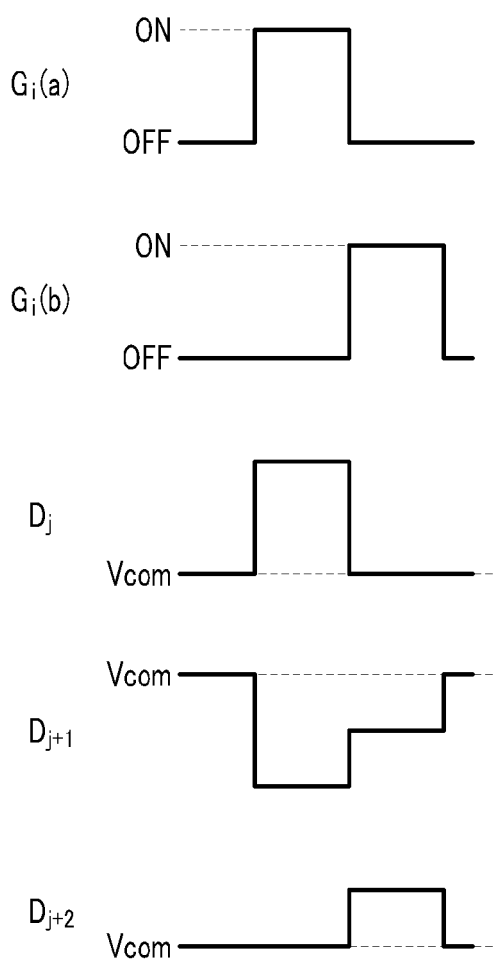
FIG. 6 is a signal timing diagram of an exemplary embodiment of wave forms of signals applied to one pixel of the liquid crystal display in FIG. 5.

An arrangement and driving method of pixels and signal lines of an exemplary embodiment of a liquid crystal display according to the present invention will be described hereafter with reference to FIG. 5 and FIG. 6. FIG. 5 is a schematic circuit diagram of an exemplary embodiment of four pixels of the liquid crystal display according to the present invention, and FIG. 6 is a signal timing diagram illustrating an exemplary embodiment of wave forms of signals applied to one pixel of the liquid crystal display of FIG. 5.

Referring back to FIG. 2 and as shown in FIG. 5, a liquid crystal display may include a first pixel PX(m, n) and a second pixel PX(m, n+1) adjacent to the first pixel PX(m, n) in a pixel row direction, a third pixel PX(m+1, n) and a fourth pixel PX(m+1 and n+1), respectively, adjacent to the first pixel PX(m, n) and the second pixel PX(m, n+1) in a pixel column direction, and signal lines Gi(a), Gi(b), Gi+1(a), Gi+1(b), Dj, Dj+1, and Dj+2 connected thereto. The signal lines Gi(a), Gi(b), Gi+1(a), Gi+1(b), Dj, Dj+1, and Dj+2 include pairs of gate lines which transmit gate signals (alternatively referred to as "scanning signals"), for example, a i-th (where "i" is a natural number less than or equal to "n") pair of gate lines Gi(a) and Gi(b), and a (i+1)-th pair of gate lines Gi+1(a) and Gi+1(b), and data lines which transmit data voltages including a j-th (where "j" is a natural number less than or equal to "m") data line, e.g. a first data line Dj, a (j+1)-th data line, e.g., a second data line Dj+1, and a (j+2)-th data line, e.g., a third data line Dj+2.

The first pixel PX(m, n) is connected to a first upper gate line Gi(a), which is one of the i-th pair of gate lines Gi(a) and Gi(b), the first data line Dj and the second data line Dj+1. The first pixel PX(m, n) includes a first switching element Qa connected to the first gate line Gi(a) and the first data line Dj, a second switching element Qb connected to the first upper gate line Gi(a), and the second data line Dj+1, a liquid crystal capacitor Clc connected to the first and second switching elements Qa and Qb, and a first storage capacitor Csta and a second storage capacitor Cstb connected to the liquid crystal capacitor Clc. An alternative exemplary embodiment may not include the first and second storage capacitors Csta and Cstb. The first and second switching elements Qa and Qb, may be three terminal elements, such as thin film transistors, for example. The first storage capacitor Csta may include a control terminal connected to the first upper gate line Gi(a), an input terminal connected to the first data line Dj, and an output terminal connected to the liquid crystal capacitor Clc and the first storage capacitor Csta, and the second storage capacitor Cstb may include a control terminal connected to the first gate line Gi(a), an input terminal connected to the second data line Dj+1, and a second output terminal connected to the liquid crystal capacitor Clc and the second storage capacitor Cstb. The liquid crystal capacitor Clc includes the first pixel electrode PEa and the second pixel electrode PEb as two terminals thereof, and the liquid crystal layer 3 between the first pixel electrode and the second pixel electrode may be a dielectric. The first pixel electrode PEa is connected to the first switching element Qa, and the second pixel electrode PEb is connected to the second switching element Qb.

The second pixel PX(m, n+1) adjacent to the first pixel PX(m, n) in the pixel row direction is connected to a first lower gate line Gi(b), which is the other of the i-th pair of gate lines Gi(a) and Gi(b), the second data line and the third data line Dj+2. The second pixel PX(m, n+1) includes a first switching element Qa connected to the second gate line Gi(b) and the second data line Dj+1, a second switching element Qb connected to the first lower gate line Gi(b) and the third data line Dj+2, a liquid crystal capacitor Clc connected to the first and second switching elements Qa and Qb, and a first storage capacitor Csta and a second storage capacitor Cstb connected to the liquid crystal capacitor Clc.

The third pixel PX(m+1, n) adjacent to the first pixel PX(m, n) in the pixel column direction is connected to the second upper gate line Gi+1(a), which is one of the (i+1)-th pair of gate lines Gi+1(a) and Gi+1(b), the third data line Dj and the second data line Dj+1, and includes a first switching elements Qa connected to the second upper Gi+1(a) and the first data line Dj, a second switching element Qb connected to the second upper gate line Gi+1(a) and the second data line Dj+1, a liquid crystal capacitor Clc connected to the first and second switching elements Qa and Qb, and a first storage capacitor Csta and a second storage capacitor Cstb connected to the liquid crystal capacitor Clc.

The fourth pixel PX(m+1, n+1) adjacent to the second pixel PX(m, n+1) in the pixel column direction is connected to the second lower gate line Gi+1(b) which is the other of the (i+1)-th pair of gate lines Gi+1(a) and Gi+1(b), the second data line Dj+1, and the third data line Dj+2, and includes a first switching elements Qa connected to the second lower gate line Gi+1(b) and the second data line Dj+1 and a second switching element Qb connected to the second lower gate line Gi+1(b) and the third data line Dj+2, a liquid crystal capacitor Clc connected to the first and second switching elements Qa and Qb, and a first storage capacitor Csta and a second storage capacitor Cstb connected to the liquid crystal capacitor Clc.

The first pixel PX(m, n) and the second pixel PX(m, n+1) adjacent to each other in the pixel row direction are both connected to the second data line Dj+1, and the third pixel PX(m+1, n) and the fourth pixel PX(m+1, n+1) are both connected to the second data line Dj+1.

As shown in FIG. 5 and FIG. 6, when the first upper gate line Gi(a) of the i-th pair of gate lines Gi(a) and Gi(b) receives a gate-on voltage, a first data voltage is applied to the first pixel PX(m, n) through the first and second switching elements Qa and Qb of the first pixel PX(m, n) that are turned on. In an exemplary embodiment, the first pixel electrode PEa of the first pixel PX(m, n) receives the first data voltage from the first data line Dj through the first switching element Qa of the first pixel PX(m, n), and the second pixel electrode PEb of the first pixel PX(m, n) receives a second data voltage from the second data line Dj+1 through the second switching element Qb of the first pixel PX(m, n). When the first lower gate line Gi(b) of the i-th pair of gate lines Gi(a) and Gi(b) receives the gate-on voltage, the second data voltage is applied to the second pixel PX(m, n+1) through the first and second switching elements of the second pixel PX(m, n+1) that are turned on. The first pixel electrode PEa of the second pixel PX(m, n+1) receives the second data voltage from the second data line Dj+1 through the first switching element Qa of the second pixel PX(m, n+1), and the second pixel electrode PEb of the second pixel PX(m, n+1) receives a third data voltage from the third data line Dj+2 through the second switching element Qb of the second pixel PX(m, n+1). Accordingly, a data voltage to be transmitted to the second pixel electrode PEb of the first pixel PX(m, n) is applied to the second data line Dj+1 during a time that the first upper gate line Gila) receives the gate-on signal, and a data voltage to be transmitted to the first pixel electrode PEa of the second pixel PX(m, n+1) is applied to the second data line Dj+1 during a time that the first lower gate line Gi(b) receives the gate-on signal.

Voltages applied to the first and second pixel electrodes PEa and PEb of the first pixel PX(m, n) and the third pixel PX(m, n+1) are data voltages corresponding to a luminance for the first pixel PX(m, n) and the third pixel PX(m, n+1) to be respectively displayed, and have opposite polarities with respect to the reference voltage Vref, for example, a common voltage Vcom of a common electrode (not shown). In an exemplary embodiment, when a polarity of the first data voltage applied to the first data line Dj is positive, a polarity of the second data voltage applied to the second data line Dj+1 is negative and a polarity of the third data voltage applied to the third data line Dj+2 is positive. When the polarity of the first data voltage applied to the first data line Dj is negative, the polarity of the second data voltage applied to the second data line Dj+1 is positive and the polarity of the third data voltage applied to the third data line Dj+2 is negative. As described above, the data lines of an exemplary embodiment of a liquid crystal display according to the present invention may be driven with a column inversion.

In a conventional liquid crystal display, two pixels adjacent to each other in the pixel row direction are connected to one gate line and four different data lines. That is, the first and second switching elements connected to the first and second pixel electrodes of each of the two pixels are connected to a same gate line, but they are connected to different data lines such that they receive the data voltages through the different data lines.

In an exemplary embodiment of a liquid crystal display according to the present invention, two pixels of the liquid crystal display adjacent to each other in the pixel row direction are respectively connected to one gate line of a pair of gate lines and the other gate line of the pair of gate lines, and connected to three data lines by sharing a middle data line of the three data lines disposed in a middle portion of the two pixels adjacent to the two pixels. Accordingly, a number of data lines is reduced, and the cost of the driver of the liquid crystal display is thereby substantially reduced. In an exemplary embodiment, gate lines are disposed in pairs, and a number of gate lines is thereby substantially increased, however gate signals are gate on/off signals, and an operation of a gate driver is thereby simplified, while the manufacturing cost is reduced.

Figure 7:
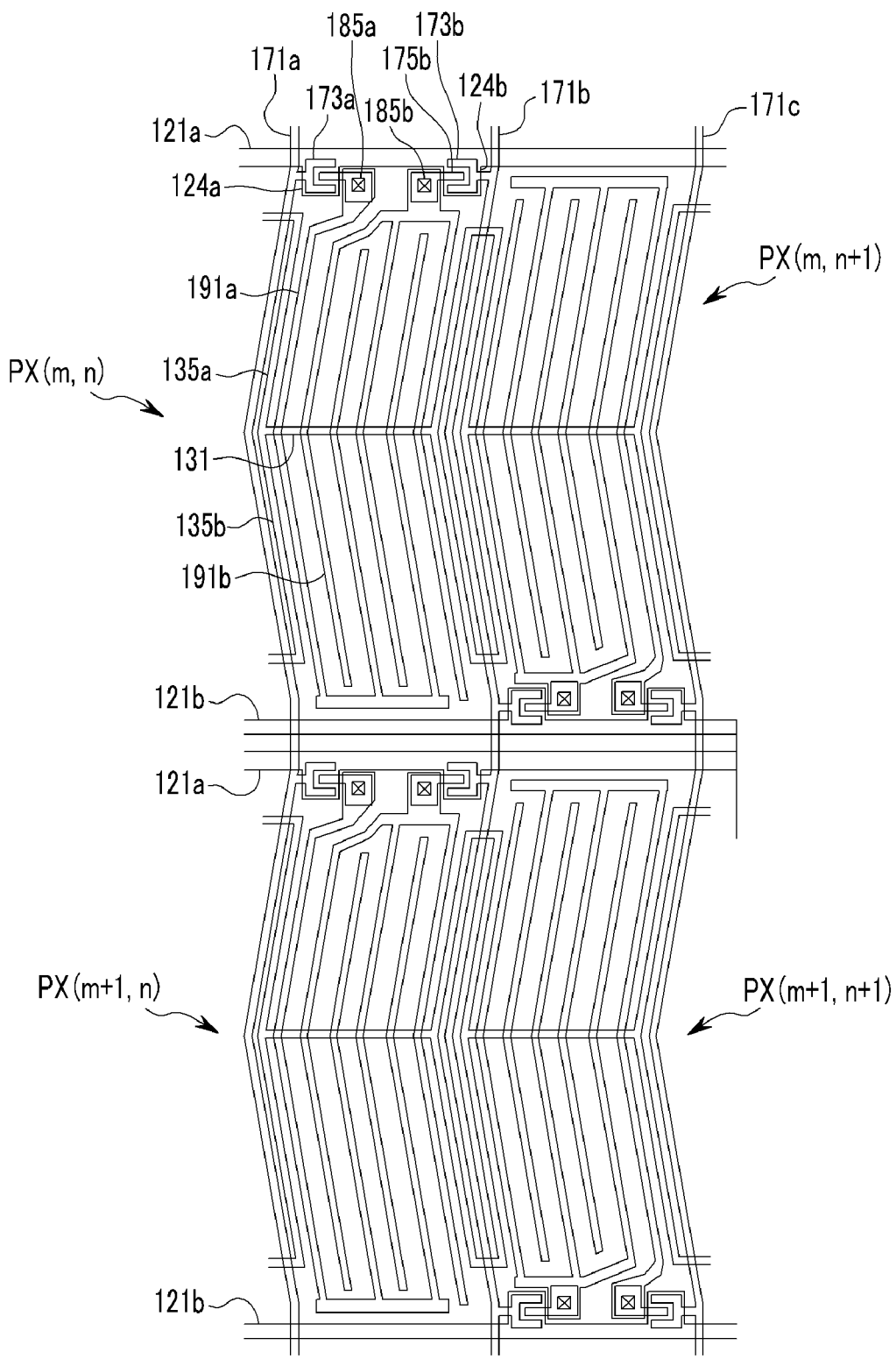
FIG. 7 is a plan view illustrating a layout of an exemplary embodiment of four pixels of a liquid crystal display in FIG. 5.

An exemplary embodiment of the pixel of the liquid crystal display shown in FIG. 5 will be described hereafter with reference to FIG. 7. FIG. 7 is a plan view illustrating a layout of an exemplary embodiment of four pixels of the liquid crystal display shown in FIG. 5.

Referring back to FIG. 5 and as shown in FIG. 7, an exemplary embodiment of the liquid crystal display includes the first pixel PX(m, n) and the second pixel PX(m, n+1), the third pixel PX (m+1, n) and the fourth pixel PX (m+1, n+1) respectively adjacent to the first pixel PX(m, n) and the second pixel PX(m, n+1) in the pixel column direction, pairs of gate lines, for example, a pair of gate lines including a first upper gate line 121a1 and a first lower gate line 121b1, and a pair of gate lines including a second upper gate line 121a2 and a second lower gate line 121b2, and data lines, for example, a first data line 171a, a second data line 171b and a third data line 171c connected thereto. Each of the first pixel PX(m, n), the second pixel PX(m, n+1), the third pixel PX(m+1, n), and the fourth pixel PX(m+1, n+1) includes a first pixel electrode 191a and a second pixel electrode 191b connected to a first switching element and a second switching element, respectively. The first switching element and the second switching element may be three terminal elements such as thin film transistors, for example. The first switching element and the second switching element, respectively, include control electrodes, e.g., a first gate electrode 124a and a second gate electrode 124b, input electrodes, e.g., a first source electrode 173a and a second source electrode 173b, and output electrodes, e.g., a drain electrode 175a and a second drain electrode 175b. The control electrodes of the first and second switching elements are respectively connected to one line and the other line of the pair of gate lines 121a and 121b, the input electrodes of the first and second switching elements are respectively connected to one line and another line of the data lines 171a, 171b and 171c, and the output electrodes of the first and second switching elements are respectively connected to the first pixel electrode 191a and the second pixel electrode 191b through a first contact hole 185a and a second contact hole 185b. The first pixel electrode 191a and the second pixel electrode 191b may be substantially alternately disposed on a same layer.

In an exemplary embodiment, the liquid crystal display includes a storage electrode line 131 and storage electrodes 135a and 135b, and the storage electrodes 135a and 135b overlap the first pixel electrode 191a and the second pixel electrode 191b thereby forming storage capacitors.

Figure 8:
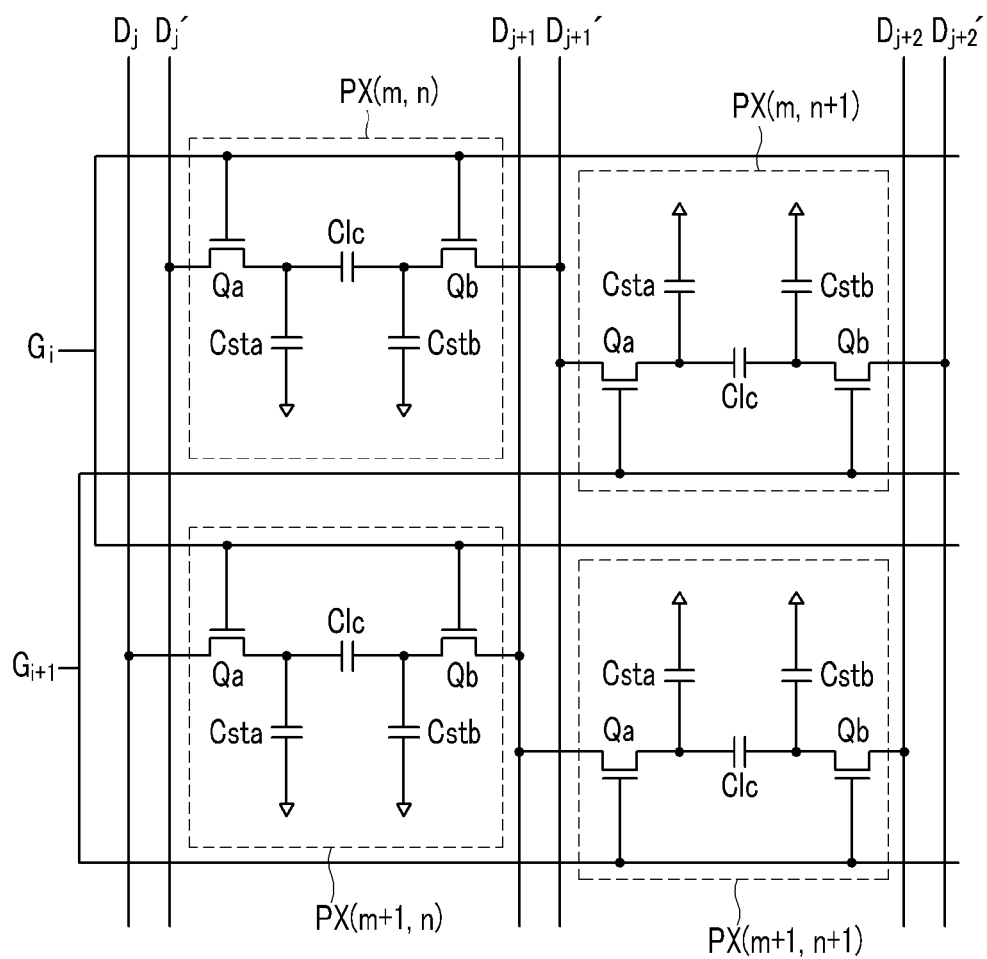
FIG. 8 is a schematic circuit diagram of an alternative exemplary embodiment of four pixels of a liquid crystal display according to the present invention.

An alternative exemplary embodiment of an arrangement and driving method of pixels and signal lines of an exemplary embodiment of a liquid crystal display according to the present invention will be described hereafter with reference to FIG. 2 and FIG. 8. FIG. 8 is a schematic circuit diagram of an alternative exemplary embodiment of four pixels of a liquid crystal display according to the present invention.

As shown in FIG. 8, the liquid crystal display includes a first pixel PX(m, n) and a second pixel PX(m, n+1) adjacent to the first pixel PX(m, n) in the pixel row direction, a third pixel PX(m+1, n) and a fourth pixel PX(m+1, n+1) respectively adjacent to the first pixel PX(m, n) and the second pixel PX(m, n+1) in the pixel column direction, gate lines connected thereto, for example, a first gate line Gi and a second gate line Gi+1, and pairs of data lines connected thereto, for example, a first pair of data lines Dj and Dj', a second pair of data lines Dj+1 and Dj+1', and a third pairs of data lines Dj+2 and Dj+2'.

The first gate line Gi including a first upper line and a first lower line and the second gate line Gi+1 including a second upper line and second lower line are disposed along the pixel column direction. The first pair of data lines Dj and Dj' including a first data line Dj and a second data line Dj', the second pair of data lines Dj+1 and Dj+1' including a first data line Dj+1 and a second data line Dj+1' and the third pair of data lines Dj+2 and Dj+2' including a first data line Dj+2 and a second data line Dj+2' are disposed along the pixel row direction.

A control terminal of the first switching element Qa of the first pixel and a control terminal of the second switching element Qb of the first pixel respectively connected to the first pixel electrode PEa and the second pixel electrode PEb of the first pixel PX(m, n) are connected the first upper line of the i-th gate line, e.g., the first gate line Gi, and an input terminal of the first switching element Qa and an input terminal of the second switching element Qb are respectively connected to one data line of the j-th pair of data lines, e.g., the second data line Dj' of the first pair of data lines Dj and Dj', and one data line of the (j+1)-th pair of data lines, e.g., the second data line Dj+1' of the second pair of data lines Dj+1 and Dj+1'.

A control terminal of the first switching element Qa of the second pixel and a control terminal of the second switching element Qb of the second pixel, respectively connected to the first pixel electrode PEa and the second pixel electrode PEb of the second pixel PX(m, n+1) adjacent to the first pixel PX(m, n) in the pixel row direction, are connected to an upper line of the (i+1)-th gate line, e.g., the second upper line of the second gate line Gi+1, and an input terminal of the first switching element Qa of the first pixel and an input terminal of the second switching element Qb of the first pixel are respectively connected to one data line of the (j+1)-th pair of data lines, e.g., the second data line Dj+1' of the second pair of data lines Dj+1 and Dj+1', and one data line of the (j+2)-th pair of data lines, e.g., the second data line Dj+2' of the third pair of data lines Dj+2 and Dj+2'.

A control terminal of the first switching elements Qa of the third pixel and a control terminal of the second switching element Qb of the third pixel, respectively connected to the first pixel electrode PEa and the second pixel electrode PEb of the third pixel PX(m+1, n) adjacent to the first pixel PX(m, n) in the pixel column direction, are connected to a lower line of the i-th gate line, e.g., the first lower line of the first gate line Gi, and an input terminal of the first switching element of the third pixel and an input terminal of the second switching element of the third pixel are respectively connected to one data line of the j-th pair of data lines, e.g., the first data line Dj of the first pair of data lines Dj and Dj' and one data line of the (j+1)-th pair of data lines, e.g., the second data line Dj+1' of the second pair of data lines Dj+1 and Dj+1'.

A control terminal of the first switching element of the fourth pixel and a control terminal of the second switching element Qb of the fourth pixel, respectively connected to the first pixel electrode PEa and the second pixel electrode PEb of the fourth pixel PX(m+1, n+1) adjacent to the second pixel PX(m, n+1) in the pixel column direction and the third pixel PX(m+1, n) in the pixel row direction, are connected to the second branch of the (i+1)-th gate line, e.g., the second lower line of the second gate line Gi+1, and an input terminal of the first switching element of the fourth pixel and an input terminal of the second switching element Qb of the fourth pixel are respectively connected to one data line of the (j+1)-th pair of data lines, e.g., the first data line Dj+1 of the second pair of data lines Dj+1 and Dj+1' and one data line of the (j+2)-th pair of data lines, e.g., the first data line Dj+2 of the third pair of data lines Dj+2 and Dj+2'. As described above, the first pixel PX(m, n) and the second pixel PX(m, n+1) adjacent to each other in the pixel row direction are connected to one data line, e.g., the second data line Dj+1' of the second pair of data lines Dj+1 and Dj+1', and the third pixel PX(m+1, n) and the fourth pixel PX(m+1, n+1) adjacent to each other in the pixel row direction are connected to one data line, e.g., the first data line Dj+1 of the second pair of data lines Dj+1 and Dj+1', in an exemplary embodiment of the liquid crystal display. In an exemplary embodiment, the first pixel PX(m, n) and the third pixel PX(m+1, n) adjacent to each other in the pixel column direction are respectively connected to an upper line and a lower line of one gate line, e.g., the first upper line and the first lower line of the first gate line Gi and thereby receives gate on/off voltages through the one gate line, e.g., the first gate line Gi, and the second pixel PX(m, n+1) and the fourth pixel PX(m+1, n+1) adjacent to each other in the pixel column direction are respectively connected to an upper line and a lower line of one gate line, e.g., the second upper line and the second lower line of the second gate line Gi+1 and thereby receives the gate on/off voltages through the one gate line, e.g., the second gate line Gi+1. Accordingly, the number of data lines and the number of gate lines are reduced, and the cost of the driver of the liquid crystal display is thereby substantially reduced and the driving speed is thereby increased.

Figure 9:
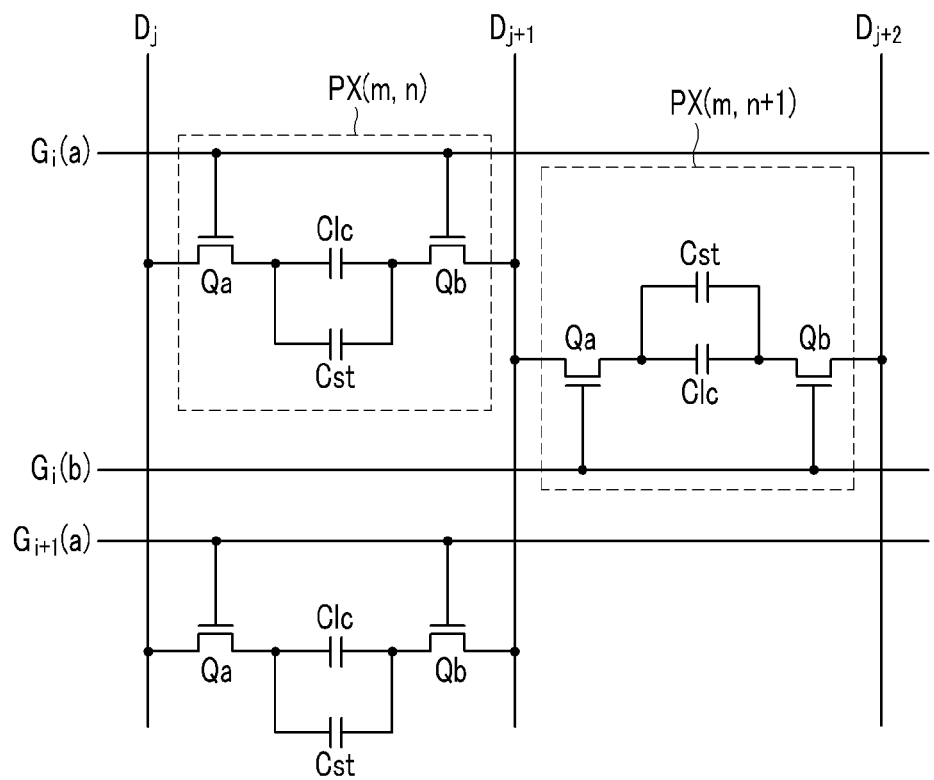
FIG. 9 is a schematic circuit diagram of an exemplary embodiment of two pixels of a liquid crystal display according to the present invention.

An alternative exemplary embodiment of an arrangement of pixels and signal lines of a liquid crystal display according to the present invention will be described hereafter with reference to FIG. 9. FIG. 9 is a schematic circuit diagram of an exemplary embodiment of two neighboring pixels of a liquid crystal display according to the present invention.

An arrangement of an exemplary embodiment of pixels and signal lines of the liquid crystal display shown in FIG. 9 is substantially similar to the arrangement of pixels and signal lines of an exemplary embodiment shown in FIG. 5. In an alternative exemplary embodiment, the first pixel PX(m, n) is connected to the first upper gate line Gi(a) of the i-th pair of gate lines Gi(a) and Gi(b), the first data line Dj and the second data line Dj+1, and the second pixel PX(m, n+1) adjacent to the first pixel PX(m, n) in the pixel row direction is connected to the first lower gate line Gi(b) of the i-th pair of gate lines Gi(a) and Gi(b), the second data line Dj+1 and the third data line Dj+2. The first pixel PX(m, n) and the second pixel PX(m, n+1) adjacent to each other in the pixel row direction are connected to the middle data line of the three data line, e.g., the second data line Dj+1.

In an alternative exemplary embodiment, as show in FIG. 5, two terminals of a storage capacitor Cst of a pixel are connected to an output terminal of a first switching element Qa of the pixel and a second switching element Qb of the pixel.

Figure 10:
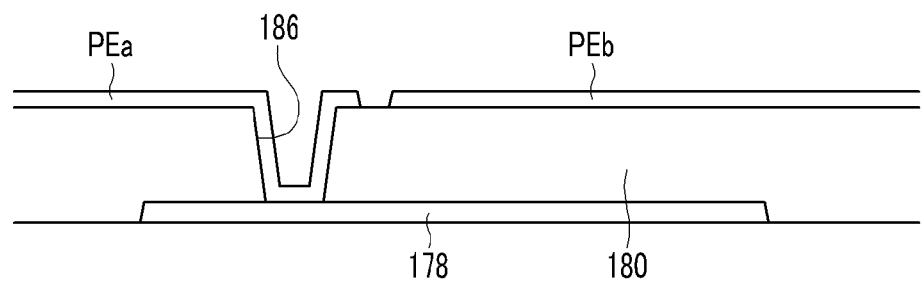
FIG. 10 is a partial cross-sectional view of an exemplary embodiment of a storage capacitor in a liquid crystal display according to the present invention.

FIG. 10 is a partial cross-sectional view of an exemplary embodiment of a storage capacitor Cst in a liquid crystal display according to the present invention.

As shown in FIG. 10, a first pixel electrode PEa of a pixel is connected to a storage capacitance electrode 178 through a contact hole 186, and a voltage that the first pixel electrode PEa receives is thereby transmitted to the storage capacitance electrode 178. The storage capacitance electrode 178 overlaps the second pixel electrode PEb via an insulating layer 180, and the storage capacitance electrode 178 and the second pixel electrode PEb thereby form the storage capacitor Cst.

Figure 11:
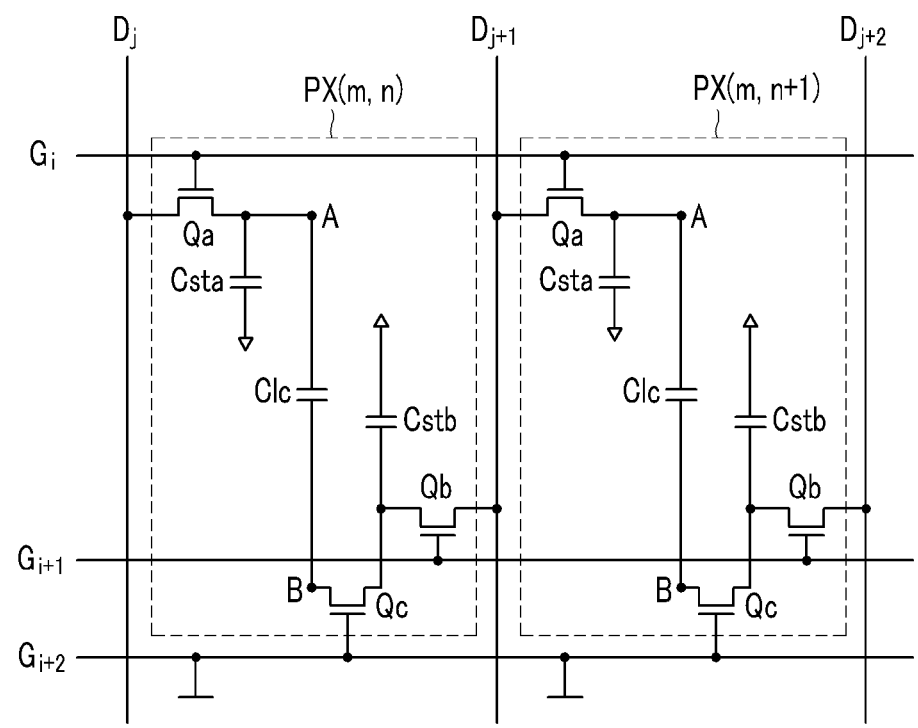
FIG. 11 is a schematic circuit diagram of an exemplary embodiment of two pixels of a liquid crystal display according to the present invention.

An exemplary embodiment of an arrangement of pixels and signal lines, and a driving method of a liquid crystal display will be described hereafter with reference to FIG. 11 and FIG. 2. FIG. 11 is a schematic circuit diagram of an exemplary embodiment of two pixels of a liquid crystal display according to the present invention.

Referring back to FIG. 2 and as shown in FIG. 11, an exemplary embodiment of the liquid crystal display includes the first pixel PX(m, n) and the second pixel PX(m, n+1) adjacent to each other in the pixel row direction, and gate lines connected thereto, e.g., a first gate line Gi, a second gate line Gi+1, and a third gate line Gi+2, and data lines connected thereto, e.g., a first data line Dj, a second data line Dj+1, and a third data line Dj+2.

The first pixel PX(m, n) includes a first switching element Qa connected to the i-th gate line, e.g., the first gate line Gi, and the j-th data line, e.g., the first data line Dj, a second switching element Qb connected to the (i+1)-th gate line, e.g., the second gate line Gi+1, and the (j+1)-th data line, e.g., the second data line Dj+1, a first storage capacitor Csta connected to the first switching element Qa of the first pixel and a second storage capacitor Cstb connected to the second switching element Qb of the first pixel. The first pixel PX(m, n) further includes a third switching element Qc connected to the (i+2)-th gate line, e.g., the third gate line Gi+2, and an output terminal of the second switching element Qb of the first pixel.

The first pixel electrode PEa of the first pixel is connected to the first switching element Qa of the first pixel, and the second pixel electrode PEb of the first pixel is connected to the second switching element Qb of the first pixel through the third switching element Qc of the first pixel.

The second pixel PX(m, n+1) adjacent to the first pixel PX(m, n) in the pixel row direction includes a first switching element Qa connected to the i-th gate line, e.g., the first gate line Gi, and the (j+1)-th data line, e.g., the second data line Dj+1, a second switching element Qb connected to the (i+1)-th gate line, e.g., the second gate line Gi+1, and the (j+2)-th data line, e.g., the third data line Dj+2, and a first storage capacitor Csta connected to the first switching element Qa of the second pixel and a second storage capacitor Cstb connected to a second switching element Qb of the second pixel. In an exemplary embodiment, the second pixel PX(m, n+1) further includes a third switching element Qc connected to the (i+2)-th gate line, e.g., the third gate line Gi+2, and to an output terminal of the second switching element Qb of the second pixel.

The first pixel PX(m, n) and the second pixel PX(m, n+1) adjacent to each other in the pixel row direction are connected to the (j+1)-th data line, e.g., the second data line Dj+1.

When the first gate line Gi receives a gate-on voltage, a first data voltage and a second data voltage are respectively applied to the first pixel PX(m, n) through the first switching element Qa of the first pixel that is thereby turned on and to the second pixel PX(m, n+1) through the first switching element Qa of the second pixel that is thereby turned on. That is, the first pixel electrode PEa of the first pixel PX(m, n) receives the first data voltage from the first data line Dj through the first switching element Qa of the first pixel and a point A of the first pixel thereby receives the first data voltage, and the first pixel electrode PEa of the second pixel PX(m, n+1) receives the second data voltage from the second data line Dj+1 through the first switching element Qa of the second pixel and a point A of the second pixel thereby receives the second data voltage.

When the first gate line Gi receives a gate-off voltage and the second gate line Gi+1 receives the gate-on voltage, the point A of the first pixel and the point A of the second pixel are floated, and the first data voltage is applied to the first pixel PX(m, n) through the second switching element of the first pixel that is thereby turned on, and the second data voltage is applied to the second pixel PX(m, n+1) through the second switching element of the second pixel that is thereby turned on. That is, the second pixel electrode PEb of the first pixel PX(m, n) and the second pixel electrode PEb of the second pixel PX(m, n+1) respectively receive the second data voltages from the second data line Dj+1 through the second switching element Qb of the first pixel and the third data voltage from the third data line Dj+2 through the second switching element Qb of the second pixel.

When the second gate line Gi+1 receives the gate-off voltage and the third gate line Gi+2 receives the gate-on voltage, the output terminal of the second switching element Qb of the first pixel and the output terminal of the second switching element Qb of the second pixel are floated, and the third switching element Qc of the first pixel and the third switching element Qc of the second pixel are turned-on, and the first data voltage and second data voltage respectively charged and applied to the second pixel electrode PEb of the first pixel and to the second pixel electrode PEb of the second pixel are respectively transmitted to a point B of the first pixel through the third switching element Qc of the first pixel and to a point B of the second pixel through the third switching element Qc of the second pixel. Accordingly, voltages of predetermined magnitudes are charged between the point A and the point B of the first pixel forming two terminals of the liquid crystal capacitor Clc of the first pixel and between the point A and the point B of the second pixels forming two terminals of the liquid crystal capacitor Clc of the second pixels, respectively. In an exemplary embodiment, data voltages respectively applied to the two terminals of the liquid crystal capacitor Clc of the first and second pixel may correspond to luminances of the first pixel PX(m, n) and the second pixel PX(m, n+1) to be displayed, and have opposite polarities with respect to the common voltage Vcom. In an exemplary embodiment, data voltages applied to the first and second pixel electrodes PEa and PE of the first pixel and the first and second pixel electrodes PEa and PE of the second pixel may correspond to luminances of the pixel PX(m, n) and the second pixel PX(m, n+1) to be displayed and have opposite polarities with respect to the reference electrode Vref. When the first data voltage applied to the first data line Dj is positive, the second data voltage applied to the second data line Dj+1 is negative and the third data voltage applied to the third data line Dj+2 is positive, and when the first data voltage applied to the first data line Dj is negative, the second data voltage applied to the second data line Dj+1 is positive and the third data voltage applied to the third data line Dj+2 is negative. As described above, the data lines of an exemplary embodiment of the liquid crystal display according to the present invention may be driven with a column inversion.

In a conventional liquid crystal display, when one terminal of a liquid crystal capacitor of the conventional liquid crystal display has been charged and thereby floated with one voltage, and the other terminal of the liquid crystal capacitor is being charged with another voltage having polarity opposite to a polarity of the one voltage, it is difficult for the liquid crystal capacitor of the conventional liquid crystal display to be charged with a predetermined magnitude. However, in an exemplary embodiment of the liquid crystal display according to the present invention, for example, the first and second data voltages respectively applied to the first and second pixel electrodes PEa and PEb of the first pixel through the first and second switching elements Qa and Qb of the first pixel during respective gate-on times is charged to the liquid crystal capacitor Clc of the first pixel through the output terminal of the first and second switching elements Qa and Qb of the first pixel that have been floated during a gate-off time. Accordingly, the liquid crystal capacitor Clc of the first pixel may be charged when the two terminals of the liquid crystal capacitor Clc are floated, and the first and second data voltages having opposite polarities may be charged with a predetermined magnitude.

Figure 12:
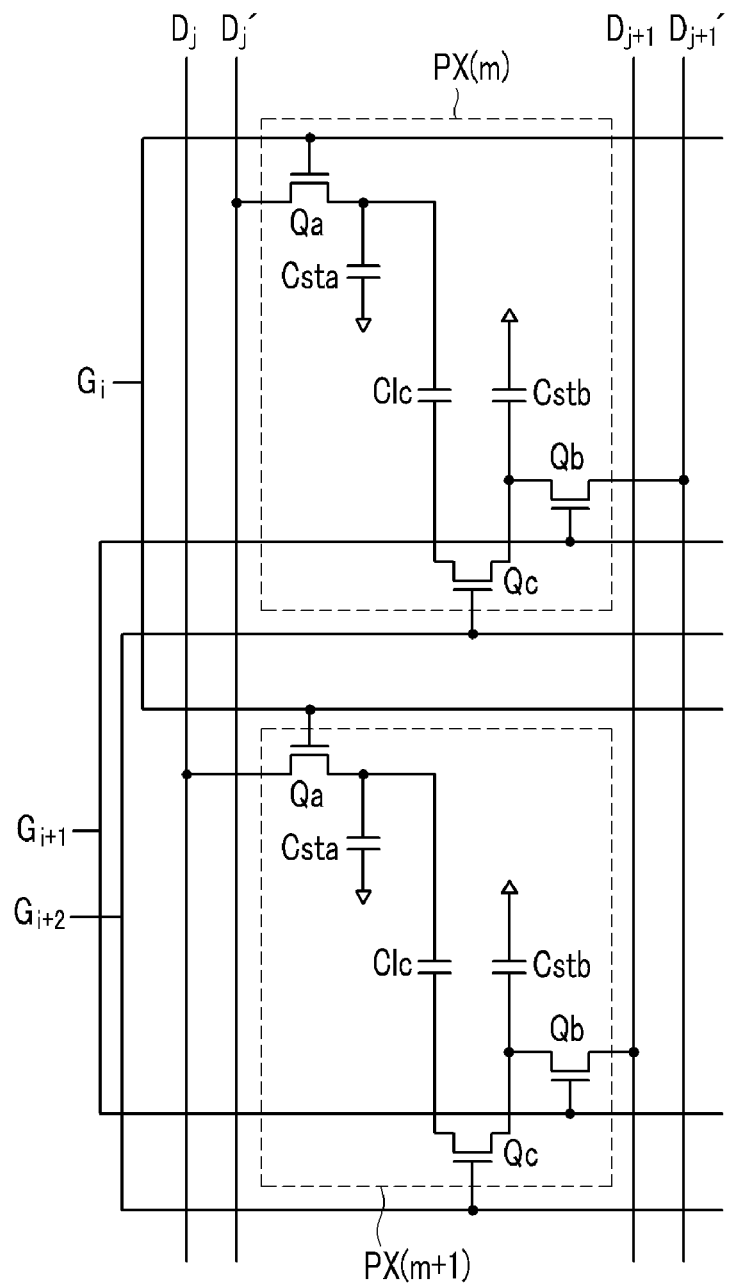
FIG. 12 is a schematic circuit diagram of an alternative exemplary embodiment of one pixel according to the present invention.

An arrangement and driving method of signal lines and pixels of an exemplary embodiment of a liquid crystal display will be described hereafter with reference to FIG. 2 and FIG. 12. FIG. 12 is a schematic circuit diagram of an exemplary embodiment of a pixel of a liquid crystal display according to the present invention.

As shown in FIG. 12, an exemplary embodiment of the liquid crystal display includes a first pixel PX(m) and a second pixel PX m+1 adjacent to each other in the pixel column direction, and gate lines, e.g., a first gate line Gi, a second gate line Gi+1, and a third gate line Gi+2, and pairs of data lines, e.g., a first pair of data lines Dj and Dj' and a second pair of data lines Dj+1, and Dj+1' connected thereto.

The first gate line Gi including a first upper line and a first lower line, the second gate line Gi+1 including a second upper line and a second lower line, and the third gate line Gi+2 including a third upper line and a third lower line are disposed along the pixel column direction. The first pair of data lines Dj and Dj' including a first data line Dj and a second data line Dj', and the second pair of data lines Dj+1 and Dj+1' including a first data Dj+1 and a second data line Dj+1', are disposed along the pixel row.

The control terminal of the first switching element Qa of the first pixel PX(m) connected to the first pixel electrode PEa of the first pixel PX(m) is connected to the first upper line of the first gate line Gi, and the input terminal thereof is connected to one data line of the j-th pair of data lines, e.g., the second data line Dj' of the first pair of data lines Dj and Dj'. The control terminal of the second switching element Qb of the first pixel PX(m) connected to the second pixel electrode PEb of the first pixel PX(m) is connected to the second upper line of the second gate line Gi+1, and the input terminal thereof is connected to one data line of the (j+1)-th pair of data lines, e.g., the second data line Dj+1' of the second pair of data lines Dj+1 and Dj+1'. The input terminal of the third switching element Qc of the first pixel PX(m) connected to the output terminal of the second switching element Qb of the first pixel PX(m) is connected to the third upper line of the third gate line Gi+2.

The control terminal of the first switching element Qa of the second pixel PX(m+1) connected to the first pixel electrode PEa of the second pixel PX(m+1) is connected to the first lower line of the first gate line Gi, and the input terminal thereof is connected to one data line of the j-th pair of data lines, e.g. the first data line Dj of the first pair of data lines Dj and Dj'. The control terminal of the second switching element Qb of the second pixel PX(m+1) connected to the second pixel electrode PEb of the second pixel PX(m+1) is connected to the second lower line of the second gate line Gi+1, and the input terminal thereof is connected to one data line of the (j+1)-th pair of data lines, e.g., the first data line Dj+1 of the second pair of data lines Dj+1 and Dj+1'. The input terminal of the third switching element Qc of the second pixel PX(m+1) connected to the output terminal of the second switching element Qb of the second pixel PX(m+1) is connected to the third lower line of the third gate line Gi+2.

As described above, in an exemplary embodiment of a liquid crystal display, the control terminal of the first switching elements Qa of the first pixel PX(m) connected to the first pixel electrode PEa of the first pixel PX(m) and the control terminal of the first switching element Qa of the second pixel PX(m+1) connected to the first pixel electrode PEa of the second pixel PX(m+1) adjacent to the first pixel PX(m) in the pixel column direction are respectively connected to the first upper line and the first lower line of the first gate line Gi, and thereby receive the gate on/off voltages from one gate line, e.g., the first gate line Gi. The control terminal of the second switching element Qb of the first pixel PX(m) and the control terminal of the second switching element Qb of the second pixel PX(m+1) are respectively connected to the second upper line and the second lower line of the same gate line Gi+1, and thereby receive the gate on/off voltages from one gate line, e.g., the second gate line Gi+1. The input terminal of the third switching element Qc of the first pixel (PX(m) connected to the output terminal of the second switching element Qb of the first pixel PX(m) and the input terminal of the third switching element Qc of the second pixel PX(m+1) connected to the output terminal of the second switching element Qb of the second pixel PX(m+1) are respectively connected to the third upper line and the third lower line of the third gate line Gi+2, and thereby receive the gate on/off voltages from one gate line, e.g., the third gate line Gi+2. Accordingly, the driving speed is substantially increased.

An arrangement and a driving method of pixels and signal lines of an exemplary embodiment of a liquid crystal display will be described hereafter with reference to FIG. 2, FIG. 13 and FIG. 14.

Figure 13:
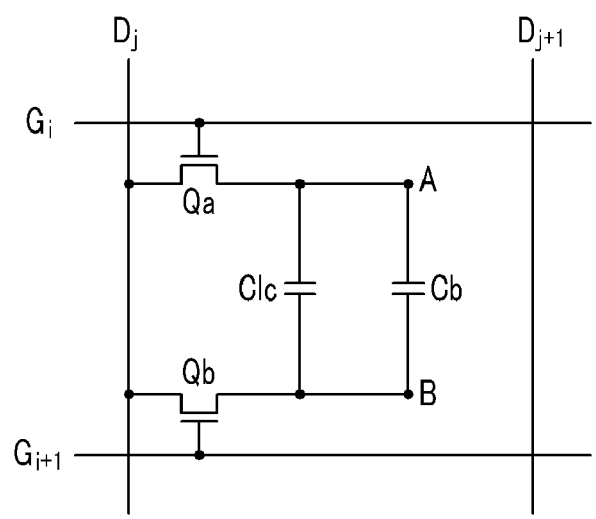
FIG. 13 is a schematic circuit diagram of another alternative exemplary embodiment of one pixel in a liquid crystal display according to the present invention.
Figure 14:
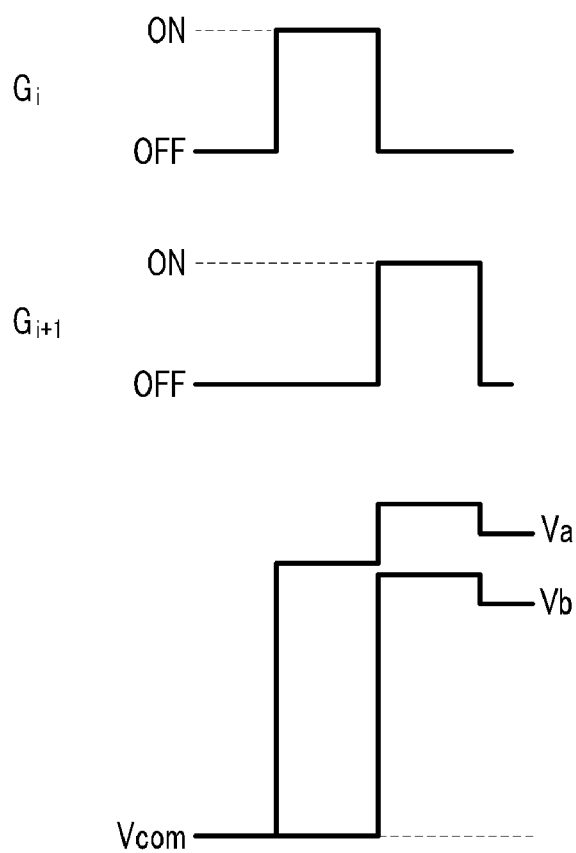
FIG. 14 is a signal timing diagram of an exemplary embodiment of waveforms of signals applied to the one pixel of the liquid crystal display in FIG. 13.

FIG. 13 is a schematic circuit diagram of an exemplary embodiment of one pixel in a liquid crystal display according to the present invention, and FIG. 14 is a signal timing diagram illustrating an exemplary embodiment of waveforms of a signal applied to the one pixel of the liquid crystal display in FIG. 13.

Referring back to FIG. 2 and as shown in FIG. 13, an exemplary embodiment of a liquid crystal display includes the first switching element Qa connected to the first pixel electrode PEa of the pixel PX, the second switching element Qb connected to the second pixel electrode PEb of the pixel PX, gate lines including a first gate line Gi and a second gate line Gi+1, and a data line Dj. In an exemplary embodiment, the liquid crystal display includes the liquid crystal capacitor Clc and a step-up capacitor Cb connected to the first and second switching elements Qa and Qb. The control terminal of the first switching element Qa is connected to the first gate line Gi, and the input terminal thereof is connected to the data line Dj. The control terminal of the second switching element Qb is connected to the second gate line Gi+1, and the input terminal thereof is connected to the data line Dj. The output terminal of the first switching element Qa and The output terminals of second switching element Qb are connected to the liquid crystal capacitor Clc and the step-up capacitor Cb. Two terminals of the step-up capacitor Qb are connected to the first switching element Qa and the second switching element Qb.

A driving method of an exemplary embodiment of a liquid crystal display in FIG. 13 will be described hereafter with reference to FIG. 14.

Referring back to FIG. 13 and as shown in FIG. 14, when the first gate line Gi receives the gate-on signal and the first switching element Qa is thereby turned on, the first pixel electrode PEa receives one data voltage from the data line Dj and a point A is charged with the one data voltage.

When the first gate line Gi receives a gate-off signal, the second gate line Gi+1 receives a gate-on signal, and the second switching element Qb is thereby turned on, the second pixel electrode PEb receives other data voltage through the data line Dj, and a point B is charged with the other data voltage. When a voltage of the point A Va is increased, a voltage of the point B Vb is thereby increased, and a voltage charged between the two terminals of the liquid crystal capacitor Clc connected to the point A and the point B is thereby changed and a magnitude of the charging voltage is thereby varied based on a capacity of the step-up capacitor Cb. Accordingly, by changing a capacity of the step-up capacitor Cb, the voltage charged to the liquid crystal capacitor Clc when the pixel receives two gate-on signals, is changed to have a predetermined magnitude.

In an exemplary embodiment of a the liquid crystal display, the magnitude of the voltage charged to the liquid crystal capacitor may be changed by using two gate lines, one data line, and a step-up capacitor. Accordingly, compared to a liquid crystal display driven with one gate line and two data lines, a number of data lines is reduced, and the cost of the driver of the liquid crystal display is thereby substantially reduced.

Figure 15:
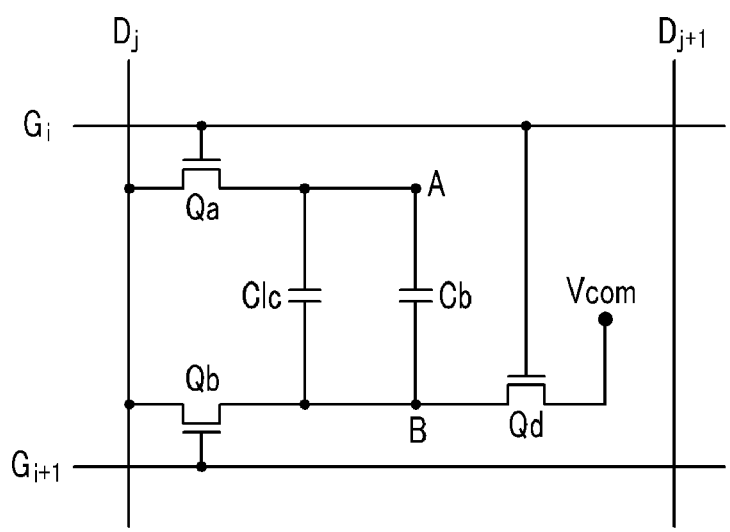
FIG. 15 is a schematic circuit diagram of an alternative exemplary embodiment of one pixel in a liquid crystal display according to the present invention.

Next, signal lines and a pixel arrangement of a liquid crystal display according to another exemplary embodiment of the present invention will be described with reference to FIG. 15. FIG. 15 is a schematic circuit diagram of an alternative exemplary embodiment of one pixel of a liquid crystal display according to another exemplary embodiment of the present invention.

As shown in FIG. 15, an arrangement of a pixel and signal lines of an exemplary embodiment of the liquid crystal display is substantially similar to the liquid crystal display in FIG. 13 except for a fourth switching element Qd connected to the first gate line Gi and the point B of the step-up capacitor Cb. The control terminal of the fourth switching element Qd is connected to the first gate line Gi, and the input terminal thereof is connected to a common voltage point Vcom. Accordingly, when the first gate line Gi receives the gate-on signal such that the first pixel electrode PEa of the pixel PX receives a data voltage, the point B of the step-up capacitor Cb and one terminal of the liquid crystal capacitor Clc are changed with the common voltage Vcom. The point B of the step-up capacitor Cb and the one terminal of the liquid crystal capacitor Clc is refreshed by being charged with the common voltage Vcom which is the reference voltage to the point B of the step-up capacitor Cb and the one terminal of the liquid crystal capacitor Clc, and thereby minimize an influence of the voltages charged during a previous frame to the point B of the step-up capacitor Cb and the one terminal of the liquid crystal capacitor Clc.

According to exemplary embodiments of the present invention as described herein provide advantages which include, but are not limited to, a high contrast ratio and a wide viewing angle, fast response speed of the liquid crystal, and a low manufacturing cost by substantially reducing number of signal lines in a liquid crystal display.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal display comprising:
   a first substrate;
   a second substrate disposed opposite the first substrate;
   a liquid crystal layer interposed between the first and second substrates and including liquid crystal molecules;
   a first gate line disposed on the first substrate and which transmits a first gate signal;
   a second gate line disposed on the first substrate and which transmits a second gate signal;
   a first data line disposed on the first substrate;
   a second data line disposed on the first substrate;
   a third data line disposed on the first substrate;
   a first switching element connected to the first gate line and the first data line;
   a second switching element connected to the first gate line and the second data line;
   a third switching element connected to the second gate line and the second data line;
   a fourth switching element connected to the second gate line and the third data line;
   a first pixel electrode connected to the first switching element;
   a second pixel electrode connected to the second switching element and separated from the first pixel electrode;
   a third pixel electrode connected to the third switching element; and
   a fourth pixel electrode connected to the fourth switching element and separated from the third pixel electrode,
   wherein the first pixel electrode and the second pixel electrode form a first liquid crystal capacitor, and the third pixel electrode and the fourth pixel electrode form a second liquid crystal capacitor,
   wherein
   the first pixel electrode includes first branches,
   the second pixel electrode includes second branches,
   the first branches of the first pixel electrode and the second branches of the second pixel electrode are alternately disposed on the first substrate,
   the third pixel electrode includes third branches,
   the fourth pixel electrode includes fourth branches, and
   the third branches of the third pixel electrode and the fourth branches of the fourth pixel electrode are alternately disposed on the first substrate,
   the liquid crystal display further comprising:

a third gate line disposed on the first substrate;
a fourth gate line disposed on the first substrate;
a fourth data line disposed on the first substrate;
a fifth data line disposed on the first substrate;
a sixth data line disposed on the first substrate;
a fifth switching element connected to the third gate line and the fourth data line;
a sixth switching element connected to the third gate line and the fifth data line;
a seventh switching element connected to the fourth gate line and the fifth data line;
an eighth switching element connected to the fourth gate line and the sixth data line;
a fifth pixel electrode connected to the fifth switching element;
a sixth pixel electrode connected to the sixth switching element and separated from the fifth pixel electrode;
a seventh pixel electrode connected to the seventh switching element; and
a eighth pixel electrode connected to the eighth switching element and separated from the seventh pixel electrode,
wherein
the third gate line is connected to the first gate line and transmits the first gate signal,
the fourth gate line is connected to the second gate line and transmits the second gate signal,
the fifth pixel electrode and the sixth pixel electrode form a third liquid crystal capacitor, and
the seventh pixel electrode and the eighth pixel electrode form a fourth liquid crystal capacitor.

2. The liquid crystal display of claim 1, wherein
the first data line and the fourth data line are disposed substantially adjacent to each other,
the second data line and the fifth data line are disposed substantially adjacent to each other, and
the third data line and the sixth data line are disposed substantially adjacent to each other.

3. The liquid crystal display of claim 2, wherein
the fifth pixel electrode includes fifth branches,
the sixth pixel electrode includes sixth branches,
the fifth branches of the fifth pixel electrode and the sixth branches of the sixth pixel electrode are alternately disposed on the first substrate,
the seventh pixel electrode includes seventh branches,
the eighth pixel electrode includes eighth branches, and
the seventh branches of the seventh pixel electrode and the eighth branches of the eighth pixel electrode are alternately disposed on the first substrate.

4. The liquid crystal display of claim 1, further comprising:
a capacitive electrode connected to the first pixel electrode and which overlaps the second pixel electrode with an insulating layer disposed therebetween,
wherein the capacitive electrode and the second pixel electrode form a storage capacitor.

* * * * *